(12) United States Patent
Li et al.

(10) Patent No.: US 10,031,880 B2
(45) Date of Patent: Jul. 24, 2018

(54) NETWORK DEVICE AND INFORMATION TRANSMISSION METHOD

(71) Applicant: Huawei Technologies Co., Ltd., Shenzhen (CN)

(72) Inventors: Jianzhao Li, Shenzhen (CN); Lu Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 425 days.

(21) Appl. No.: 14/565,982

(22) Filed: Dec. 10, 2014

(65) Prior Publication Data

US 2015/0180803 A1 Jun. 25, 2015

(30) Foreign Application Priority Data

Dec. 20, 2013 (CN) .......................... 2013 1 0713871

(51) Int. Cl.
*G06F 13/42* (2006.01)
*H04L 12/933* (2013.01)
*H04L 12/931* (2013.01)

(52) U.S. Cl.
CPC .......... *G06F 13/4282* (2013.01); *H04L 49/15* (2013.01); *H04L 49/352* (2013.01)

(58) Field of Classification Search
None
See application file for complete search history.

(56) References Cited

U.S. PATENT DOCUMENTS

| | | | | |
|---|---|---|---|---|
| 6,662,332 B1 * | 12/2003 | Kimmitt | ............. | H03M 13/276 714/701 |
| 7,945,884 B1 | 5/2011 | Goergen et al. | | |
| 2003/0179709 A1 * | 9/2003 | Huff | ........................ | H04L 12/26 370/248 |
| 2004/0085954 A1 * | 5/2004 | Iacovino | ................. | H04J 3/085 370/385 |
| 2005/0281282 A1 | 12/2005 | Gonzalez et al. | | |

(Continued)

FOREIGN PATENT DOCUMENTS

| | | |
|---|---|---|
| CN | 1588818 A | 3/2005 |
| CN | 1642135 A | 7/2005 |

(Continued)

*Primary Examiner* — Christopher Crutchfield
*Assistant Examiner* — Thinh Tran
(74) *Attorney, Agent, or Firm* — Leydig, Voit & Mayer, Ltd.

(57) ABSTRACT

The application provides a network device, which includes: a main control board and a service board, where the main control board includes a processor and a switching chip, and the service board includes a physical layer component. The switching chip is connected to the physical layer component by using a system bus. The system bus consists of a SerDes link, and is configured to transmit service data and control information of a port of the physical layer component. The processor controls the port of the physical layer component by using the control information of the port of the physical layer component. The network device transmits the service data and the control information by using the system bus, so that the service board does not need to set a CPU processing the control information, thereby expanding an interface flexibly, and reducing device complexity and hardware costs.

15 Claims, 2 Drawing Sheets

(56) References Cited

U.S. PATENT DOCUMENTS

| | | | |
|---|---|---|---|
| 2011/0305245 A1 | 12/2011 | Tanaka et al. | |
| 2012/0287829 A1* | 11/2012 | Chang | H04L 5/16 370/296 |
| 2015/0019887 A1* | 1/2015 | Yu | H04L 12/12 713/310 |
| 2015/0171892 A1* | 6/2015 | Yu | H03M 9/00 370/254 |

FOREIGN PATENT DOCUMENTS

| | | |
|---|---|---|
| CN | 773959 A | 5/2006 |
| JP | 2011259327 A | 12/2011 |
| WO | WO 2013131231 A1 | 9/2013 |

* cited by examiner

NETWORK DEVICE AND INFORMATION TRANSMISSION METHOD

CROSS-REFERENCE TO RELATED APPLICATION

This application claims priority to Chinese Patent Application No. 201310713871.3, filed on Dec. 20, 2013, which is hereby incorporated by reference in its entirety.

TECHNICAL FIELD

The present invention relates to the field of communications technologies, and in particular, to a network device and an information transmission method.

BACKGROUND

A switch is a network device configured to forward an electrical signal. The switch can provide a dedicated electrical signal channel for any two network nodes accessing the switch.

A chassis-shaped switch is mainly applied to a backbone layer of a network, and has obtained more attention in recent years. The chassis-shaped switch includes a main control board and a service board, where the service board has many slots for inserting a network interface card. The chassis-shaped switch is usually set to be a high redundancy system, is configured with an active main control board and a standby main control board, and can still provide an available and reliable network service when an uncontrollable disaster or a fault occurs.

Generally, a central processing unit (CPU) on the active main control board in the chassis-shaped switch and a CPU on the standby main control board are separately connected to a CPU on the service board by using a control bus. A switching chip on the active main control board and a switching chip on the standby main control board are separately connected to a physical layer (PHY) component on the service board by using a data bus, and provide interconnection and data exchange between service boards, where the data bus usually is a point-to-point bus. Because control information exchange between the main control board and the service board is implemented by using an independent control bus, an independent CPU and management software need to be configured for the service board. In addition, limited by the data bus, a Gigabit Ethernet (GE) interface cannot be flexibly configured as multiple 100M Ethernet interfaces. To achieve flexible configuration, a switching chip needs to be added inside the main control board, which increases hardware costs and software complexity of the chassis-shaped switch.

SUMMARY

The present invention provides a network device and an information transmission method, so as to resolve a problem of high costs and complexity of a switch in the prior art.

According to a first aspect, the present invention provides a network device, including: a main control board and a service board, where the main control board includes a processor and a switching chip; and the service board includes a physical layer component;

the switching chip is connected to the physical layer component by using a system bus;

the system bus consists of a SerDes link;

the system bus is configured to transmit service data and control information of a port of the physical layer component; and the processor is configured to control the port of the physical layer component by using the control information of the port of the physical layer component.

In a first possible implementation manner of the first aspect, the physical layer component is configured to receive a first Ethernet packet from the port of the physical layer component, and insert first control information of the port into the first Ethernet packet according to a predefined rule, so as to obtain a first Ethernet packet inserted with the control information;

the system bus is specifically configured to transmit the first Ethernet packet inserted with the control information; and the switching chip is configured to extract, according to the predefined rule, the first control information of the port from the first Ethernet packet inserted with the control information, so as to obtain the first Ethernet packet.

With reference to the first possible implementation manner of the first aspect, in a second possible implementation manner of the first aspect, the switching chip is further configured to insert, according to the predefined rule, second control information of the port into a second Ethernet packet to be sent to the port of the physical layer component;

the system bus is further specifically configured to transmit the second Ethernet packet inserted with the control information; and the physical layer component is further configured to extract, according to the predefined rule, the second control information of the port from the second Ethernet packet inserted with the control information.

In a third possible implementation manner of the first aspect, the physical layer component includes multiple ports;

the physical layer component is configured to separately insert, according to a predefined rule, first control information of a corresponding port into multiple first Ethernet packets received from the multiple ports, so as to obtain multiple first Ethernet packets inserted with the control information; and multiplex, by using a preset multiplexing manner, the multiple first Ethernet packets inserted with the control information, so as to obtain a multiplexed first Ethernet packet;

the system bus is specifically configured to transmit the multiplexed first Ethernet packet; and the switching chip is configured to demultiplex the multiplexed first Ethernet packet, so as to obtain the multiple first Ethernet packets inserted with the control information; and extract, according to the predefined rule, the first control information of the corresponding port from each first Ethernet packet inserted with the control information, so as to obtain the multiple first Ethernet packets; where the preset multiplexing manner includes: a time division multiplexing manner and a bit/byte interleaving manner.

With reference to the third possible implementation manner of the first aspect, in a fourth possible implementation manner of the first aspect, the switching chip is further configured to separately insert, according to the predefined rule, second control information of a corresponding port into multiple second Ethernet packets to be sent to the physical layer component, so as to obtain multiple second Ethernet packets inserted with the control information; and multiplex, by using the preset multiplexing manner, the multiple second Ethernet packets inserted with the control information, so as to obtain a multiplexed second Ethernet packet;

the system bus is further specifically configured to transmit the multiplexed second Ethernet packet; and the physical layer component is further configured to demultiplex the multiplexed second Ethernet packet, so as to obtain the multiple second Ethernet packets inserted with the control information; and extract, according to the predefined rule, the second control information of the corresponding port from each second Ethernet packet inserted with the control information, so as to obtain the multiple second Ethernet packets.

With reference to any one of the first to fourth possible implementation manners of the first aspect, in a fifth possible implementation manner of the first aspect, the predefined rule includes:

inserting/extracting control information in an interframe gap of an Ethernet packet; or inserting/extracting control information in a preamble of an Ethernet packet; or inserting/extracting control information in an interframe gap and a preamble of an Ethernet packet.

With reference to any one of the first aspect and the first to fifth possible implementation manners of the first aspect, in a sixth possible implementation manner of the first aspect, the network device further includes a standby main control board, where the standby main control board includes a standby processor and a standby switching chip; the standby switching chip is connected to the physical layer component by using a standby system bus; and the standby system bus consists of a SerDes link.

According to a second aspect, the present invention provides an information transmission method, which is used in a network device, where the network device includes a main control board and a service board; the main control board includes a processor and a switching chip; and the service board includes a physical layer component; the switching chip is connected to the physical layer component by using a system bus, and the system bus consists of a SerDes link; and the information transmission method includes:

transmitting, between the physical layer component and the switching chip, service data and control information of a port of the physical layer component by using the system bus; and the processor is configured to control the port of the physical layer component by using the control information of the port of the physical layer component.

In a first possible implementation manner of the second aspect, the transmitting, between the physical layer component and the switching chip, service data and control information of a port of the physical layer component by using the system bus includes:

receiving, by the physical layer component, a first Ethernet packet from the port of the physical layer component, where the first Ethernet packet includes the service data; and inserting first control information of the port into the first Ethernet packet according to a predefined rule, so as to obtain a first Ethernet packet inserted with the control information;

transmitting, by the physical layer component by using the system bus, the first Ethernet packet inserted with the control information to the switching chip; and receiving, by the switching chip, the first Ethernet packet inserted with the control information, and extracting, according to the predefined rule, the first control information of the port from the first Ethernet packet inserted with the control information, so as to obtain the first Ethernet packet.

With reference to the first possible implementation manner of the second aspect, in a second possible implementation manner of the second aspect, the transmitting, between the physical layer component and the switching chip, service data and control information of a port of the physical layer component by using the system bus further includes:

inserting, by the switching chip according to the predefined rule, second control information of the port into a second Ethernet packet to be sent to the port of the physical layer component;

transmitting, by the switching chip by using the system bus, the second Ethernet packet inserted with the control information to the physical layer component; and extracting, by the physical layer component according to the predefined rule, the second control information of the port from the second Ethernet packet inserted with the control information, so as to obtain the second Ethernet packet.

In a third possible implementation manner of the second aspect, the transmitting, between the physical layer component and the switching chip, service data and control information of a port of the physical layer component by using the system bus includes:

separately inserting, by the physical layer component according to a predefined rule, first control information of a corresponding port into multiple first Ethernet packets received from multiple ports of the physical layer component, so as to obtain multiple first Ethernet packets inserted with the control information;

multiplexing, by the physical layer component by using a preset multiplexing manner, the multiple first Ethernet packets inserted with the control information, so as to obtain a multiplexed first Ethernet packet;

transmitting, by the physical layer component, the multiplexed first Ethernet packet to the switching chip by using the system bus; and receiving, by the switching chip, the multiplexed first Ethernet packet, demultiplexing the multiplexed first Ethernet packet, so as to obtain the multiple first Ethernet packets inserted with the control information; and extracting, according to the predefined rule, the first control information of the corresponding port from each first Ethernet packet inserted with the control information, so as to obtain the multiple first Ethernet packets, where the preset multiplexing manner includes: a time division multiplexing manner and a bit/byte interleaving manner.

With reference to the third possible implementation manner of the second aspect, in a fourth possible implementation manner of the second aspect, the transmitting, between the physical layer component and the switching chip, service data and control information of a port of the physical layer component by using the system bus further includes:

separately inserting, by the switching chip according to the predefined rule, second control information of a corresponding port into multiple second Ethernet packets to be sent to the physical layer component, so as to obtain multiple second Ethernet packets inserted with the control information; and multiplexing, by using the preset multiplexing manner, the multiple second Ethernet packets inserted with the control information, so as to obtain a multiplexed second Ethernet packet;

transmitting, by the switching chip, the multiplexed second Ethernet packet to the physical layer component by using the system bus; and receiving, by the physical layer component, the multiplexed second Ethernet packet, demultiplexing the multiplexed second Ethernet packet, so as to obtain the multiple second Ethernet packets inserted with the control information; and extracting, according to the predefined rule, the second control information of the corresponding port from each second Ethernet packet inserted with the control information, so as to obtain the multiple second Ethernet packets.

With reference to any one of the first to fourth possible implementation manners of the second aspect, in a fifth possible implementation manner of the second aspect, the predefined rule includes:

inserting/extracting control information in an interframe gap of an Ethernet packet; or inserting/extracting control information in a preamble of an Ethernet packet; or inserting/extracting control information in an interframe gap and a preamble of an Ethernet packet.

According to the network device provided in the embodiments, a switching chip and a physical layer component are connected by using a system bus consists of a SerDes link, and service data and control information are transmitted by using the system bus. A processor of a main control board can centralized control the whole network device. No independent control bus is required between a service board and the main control board, and therefore, the service board does not require a processor, thereby reducing costs of the device. In addition, all network devices are controlled by the processor of the main control board, complexity of the device can be reduced, and an interface type and quantity can be flexibly expanded, thereby solving a problem of high costs and complexity of a switch in the prior art.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

A network device related in this application refers to a physical entity connected to a network, where the network device may include: a switch, a bridge, a router, a gateway, and a wireless access point (WAP).

Figure 1:
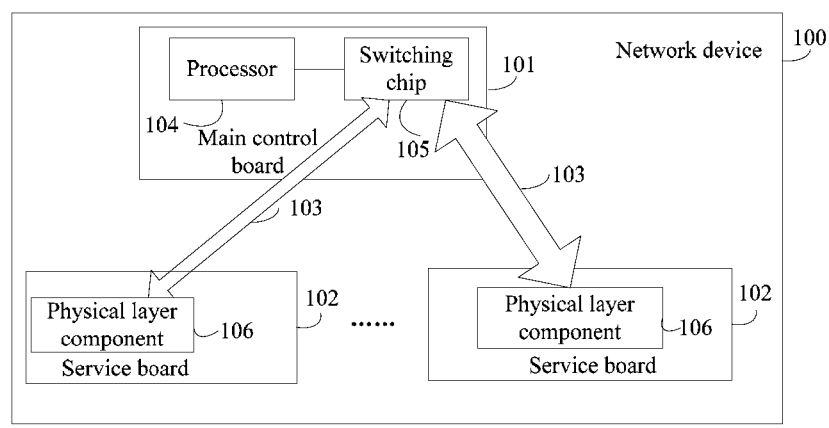
FIG. 1 is a schematic structural diagram of a network device according to an embodiment of the present invention.

FIG. 1 is a schematic structural diagram of a network device provided in an embodiment of the present invention. As shown in FIG. 1, a network device 100 may include: a main control board 101 and a service board 102.

The number of main control boards 101 may be one or two, where one is an active main control board, and the other is a standby main control board. The number of service boards 102 may be one or multiple, which is not limited in the present invention.

The main control board 101 includes a processor 104 and a switching chip 105. The service board 102 includes several physical layer components 106.

The switching chip 105 is connected to the physical layer component 106 by using a system bus 103. The system bus consists of a serializer/deserializer (SerDes) link.

The system bus 103 is configured to transmit service data and control information of a port of the physical layer component.

The processor is configured to control the port of the physical layer component by using the control information of the port of the physical layer component. The processor 104 may be a general processor, including a CPU, a network processor (NP), and the like, which is not limited in the present invention.

Optionally, the physical layer component 106 includes only one port 1061.

The physical layer component 106 is configured to receive a first Ethernet packet from the port 1061, where the first Ethernet packet includes the service data; and insert first control information of the port 1061 into the first Ethernet packet according to a predefined rule, so as to obtain a first Ethernet packet inserted with the control information. The physical layer component 106 may further include a control register 1062, which is configured to save the control information of the port 1061. The physical layer component 106 is specifically configured to read the first control information of the port 1061 from the control register 1062, and insert the first control information of the port 1061 into the first Ethernet packet according to the predefined rule.

The system bus 103 is specifically configured to transmit the first Ethernet packet inserted with the control information.

The switching chip 105 is configured to extract, according to the predefined rule, the first control information of the port 1061 from the first Ethernet packet inserted with the control information, so as to obtain the first Ethernet packet. The switching chip 105 further includes a control register 1051, which is configured to store control information. The switching chip 105 is further configured to save the extracted first control information of the port 1061 to the control register 1051. The switching chip 105 is further configured to perform exchange processing on the first Ethernet packet.

The processor 104 is configured to read the first control information of the port 1061 from the control register 1051, for example, control information A; may further be configured to perform related processing according to the read first control information of the port 1061, for example, adjust a status of the port 1061, and modify the first control information of the port 1061 in the control register 1051, for example, modify it into control information B.

Further, the switching chip 105 is further configured to insert, according to the predefined rule, second control information of the port 1061 into a second Ethernet packet to be sent to the port 1061. Specifically, the switching chip 105 reads the second control information of the port 1061 from the control register 1051, for example, the control information B, and inserts the second control information of the port 1061 into the second Ethernet packet according to the predefined rule. The second Ethernet packet may contain service data, and may not contain service data. If the second Ethernet packet does not contain the service data, the second Ethernet packet is only used to transmit the control information, so as to implement management control of the main control board 101 on the service board 102.

The system bus 103 is further specifically configured to transmit the second Ethernet packet inserted with the control information.

The physical layer component 106 is further configured to extract, according to the predefined rule, the second control information of the port 1061 from the second Ethernet packet inserted with the control information, so as to obtain the second Ethernet packet. The physical layer component 106 is further configured to save the extracted second control information of the port 1061, for example, the control information B, to the control register 1062, so that the service board 102 performs management control on the port 1061 according to the control information in the control register 1062.

In this way, the processor 104 of the main control board reads and writes the control information, in the control register 1051, of the port of the physical layer component, and the switching chip inserts the control information of the port into the to-be-sent Ethernet packet and sends the Ethernet packet to the physical layer component by using the system bus. Therefore, the processor 104 can centralized control all physical layer components on the service board, and can implement control of all network devices.

The second control information is the control information of the port 1061 acquired by the switching chip 105 from the control register 1051, and is used to deliver to the service board 102 the control information from the CPU 104 for the port 1061.

The first control information is the control information of the port 1061 acquired by the physical layer component 106 from the control register 1062, and is used to report a current status of the port 1061 to the main control board 101, and specifically, to the processor 104. The second control information and the first control information may be the same, and may be different.

In this way, by inserting the control information into the Ethernet packet, and by transmitting the control information and the service data between the main control board and the service board by using the system bus, not only data transmission and exchange is implemented, but also management control of the main control board on the service board is implemented.

Optionally, the physical layer component 106 includes multiple ports, for example, 106a and 106b.

The physical layer component 106 is configured to separately insert, according to the predefined rule, first control information of a corresponding port into multiple first Ethernet packets received from the multiple ports, so as to obtain multiple first Ethernet packets inserted with the control information, and multiplex, by using a preset multiplexing manner, the multiple first Ethernet packets inserted with the control information, so as to obtain a multiplexed first Ethernet packet. The physical layer component 106 may further include the control register 1062, which is configured to save control information of the multiple ports, for example, 106a, 106b, . . . . The physical layer component 106 is specifically configured to read the first control information of the multiple ports from the control register 1062, and separately insert the first control information of the corresponding port into the multiple first Ethernet packets according to the predefined rule, for example, read the first control information of the port 106a from the control register 1062, and insert, according to the predefined rule, the first control information of the port 106a into the first Ethernet packet received from the port 106a, and read the first control information of the port 106b from the control register 1062, and insert, according to the predefined rule, the first control information of the port 106b into the first Ethernet packet received from the port 106b.

The preset multiplexing manner includes: a time division multiplexing manner and a bit/byte interleaving manner.

The system bus 103 is specifically configured to transmit the multiplexed first Ethernet packet.

The switching chip 105 is configured to demultiplex the multiplexed first Ethernet packet, so as to obtain the multiple first Ethernet packets inserted with the control information, and extract, according to the predefined rule, the first control information of the corresponding port from each first Ethernet packet inserted with the control information, so as to obtain the multiple first Ethernet packets. The switching chip 105 further includes the control register 1051, which is configured to store control information. The switching chip 105 is further configured to save the extracted first control information of the multiple ports, for example, the first control information of the port 106a and the first control information of the port 106b, to the control register 1051.

The processor 104 is configured to read the control information of the port from the control register 1051, for example, the first control information of the port 106b; and may further perform related processing according to the read first control information of the port 106b, for example, adjusting a status of the port 106b, and modifying the control information of the port 106b in the control register 1051.

Further, the switching chip 105 is further configured to separately insert, according to the predefined rule, second control information of a corresponding port into multiple second Ethernet packets to be sent to the physical layer component 106, so as to obtain multiple second Ethernet packets inserted with the control information, and multiplex, by using the preset multiplexing manner, the multiple second Ethernet packets inserted with the control information, so as to obtain a multiplexed second Ethernet packet. Specifically, the switching chip 105 reads second control information of the multiple ports from the control register 1051, and separately inserts the second control information of the corresponding port into the multiple second Ethernet packets according to the predefined rule, for example, reads second control information of the port 106a from the control register 1051, and inserts, according to the predefined rule, the second control information of the port 106a into the second Ethernet packet to be sent to the port 106a, and reads second control information of the port 106b from the control register 1051, and inserts, according to the predefined rule, the second control information of the port 106b into the second Ethernet packet to be sent to the port 106b.

The system bus 103 is further specifically configured to transmit the multiplexed second Ethernet packet.

The physical layer component 106 is further configured to demultiplex the multiplexed second Ethernet packet, so as to obtain the multiple second Ethernet packets inserted with the control information; and extract, according to the predefined rule, the second control information of the corresponding port from each second Ethernet packet inserted with the control information, so as to obtain the multiple second Ethernet packets. The physical layer component 106 is further configured to save the extracted second control information of the port corresponding to the multiple second Ethernet packets to the control register 1062, so that the service board 102 performs management control on the port of the physical layer component 106 according to the control information in the control register 1062.

The predefined rule includes:

inserting/extracting control information in an interframe gap of an Ethernet packet; or inserting/extracting control information in a preamble of an Ethernet packet; or inserting/extracting control information in an interframe gap and a preamble of an Ethernet packet, where the control information includes: a link status and automatic negotiation control; and may further include one or multiple of the following: a transmission speed and selection; TX/RX mode selection; loopback mode control; general purpose input/output (GPIO) control; a low-speed control interface; and a sleep state.

The service board further includes: a clock circuit and a power supply module, and the like.

The main control board further includes: a monitoring module, a clock circuit, and a power supply module, and the like.

The system bus is not like a control bus, which can only transmit control information, and is not like a data bus, which can only transmit a service data packet. The system bus not only may transmit the control information, but also may transmit the service data.

According to the network device provided in this embodiment, a switching chip and a physical layer component are connected by using a system bus consists of a SerDes link, and service data and control information are transmitted by using the system bus. A processor of a main control board controls all network devices. No independent control bus is required between a service board and the main control board, and therefore, the service board does not require a processor, thereby reducing costs of the device. In addition, all network devices are controlled by the processor of the main control board, complexity of the device can be reduced, and an interface type and quantity can be flexibly expanded, thereby resolving a problem of high costs and complexity of a switch in the prior art.

Figure 2:
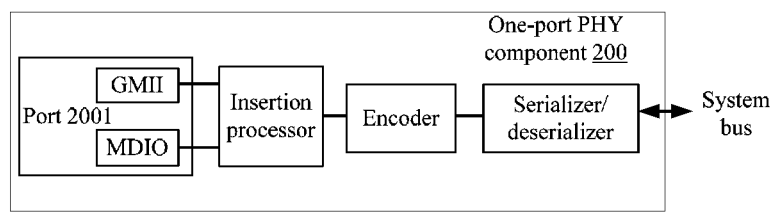
FIG. 2 is a schematic structural diagram of a single-port PHY component according to an embodiment of the present invention.

Further, based on the network device shown in FIG. 1, an embodiment of the present invention provides a single-port physical layer (PHY) component. As shown in FIG. 2, FIG. 2 is a schematic structural diagram of a single-port PHY component 200, where the single-port PHY component 200 includes only one port 2001.

The single-port PHY component 200 is configured to receive a first Ethernet packet from the port 2001, insert first control information of the port 2001 into the first Ethernet packet, and then send the first Ethernet packet inserted with the control information to a switching chip 105 by using a system bus.

The single-port PHY component 200 may further include a control register 2002, which is configured to save control information of a port. Specifically, the single-port PHY component 200 acquires the first control information of the port 2001 from the control register 2002, and inserts the first control information of the port 2001 into the first Ethernet packet according to a predefined rule. For example, as shown in FIG. 2, the first control information acquired by the single-port PHY component 200 from the control register may be an MDIO management packet self-defined according to a management data input/output (MDIO) bus, the first Ethernet packet may be a GMII Ethernet packet transmitted by using a Gigabit media independent interface (GMII). An insertion processor inserts, according to the predefined rule, the MDIO management packet into an interframe gap of the GMII Ethernet packet, or a preamble, or both the interframe gap and the preamble. Then, an encoder, for example, an encoder of an 8 b/10 b encoding format, and a SerDes processes the first Ethernet packet, and then the first Ethernet packet is sent to the switching chip 105 by using the system bus.

The system bus is specifically configured to transmit the first Ethernet packet inserted with the control information. The system bus consists of a SerDes link. The system bus is not like a control bus, which can only transmit control information, for example, an MDIO management packet, and is not like a data bus, which can only transmit service data, for example, a GMII Ethernet packet. The system bus not only may transmit the control information, but also may transmit the service data.

After receiving the first Ethernet packet inserted with the control information, the switching chip 105 extracts, according to the predefined rule, the first control information of the port 2001, for example, control information A, from the first Ethernet packet inserted with the control information, so as to obtain the first Ethernet packet; and then saves the first control information of the port 2001 into a control memory 1051 of the switching chip 105, so that a processor 104 of the main control board reads and performs related processing. For example, the processor 104 may read the control information of the port 2001, for example, the control information A, from the control register 1051; and determine, according to the read control information of the port 2001, for example, the control information A, to adjust a status of the port 2001. The processor 104 modifies the control information of the port 2001 in the control register 1051, for example, modifies into control information B.

Further, the switching chip inserts, according to the predefined rule, second control information of the port 2001 into a second Ethernet packet to be sent to the port 2001, so as to obtain a second Ethernet packet inserted with the control information; and then transmits, by using the system bus, the second Ethernet packet inserted with the control information to the single-port PHY component 200. Specifically, the switching chip 105 reads the second control information of the port 2001, for example, the control information B, from the control register 1051, and inserts the second control information of the port 2001 into the second Ethernet packet according to the predefined rule. The second Ethernet packet may contain service data, and may not contain service data. If the second Ethernet packet does not contain the service data, the second Ethernet packet is only used to transmit the control information, to implement management control of the main control board on the service board.

The system bus is further specifically configured to transmit the second Ethernet packet inserted with the control information.

After receiving the second Ethernet packet inserted with the control information, the single-port PHY component 200 extracts, according to the predefined rule, the second control information of the port 2001 from the second Ethernet packet inserted with the control information, for example, the control information B, and saves the second control information to the control register 2002, so that the service board performs management control on the port 2001 according to the second control information of the control register 2002, for example, the control information B, that is saved to the control register 2002.

A single-port PHY component provided in this embodiment inserts, according to a predefined rule, control information of a port to an Ethernet packet received by the port, sends the Ethernet packet that contains the control information of the port to a switching chip by using a system bus, and a processor of a main control board controls all network devices, thereby reducing software complexity of the device. In addition, no independent control bus is required between a service board and the main control board, and therefore, the service board does not require an independent CPU, thereby reducing hardware costs of the device.

Figure 3:
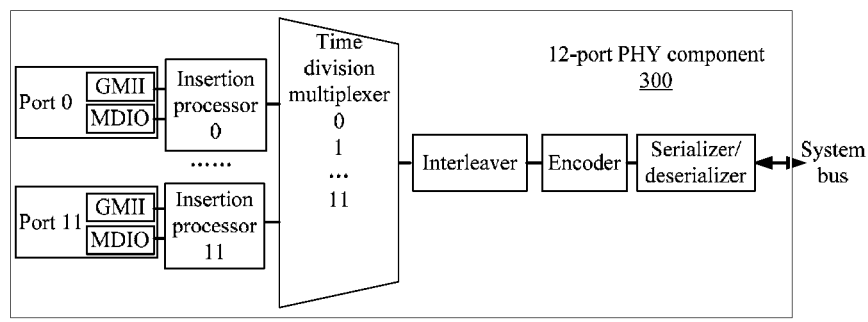
FIG. 3 is a schematic structural diagram of a multi-port PHY component according to an embodiment of the present invention.

Further, based on the network device shown in FIG. 1, an embodiment of the present invention provides a multi-port PHY component. As shown in FIG. 3, FIG. 3 is a schematic structural diagram of a 12-port PHY component 300, where the PHY component 300 includes 12 ports.

The PHY component 300 separately inserts, according to a predefined rule, first control information of a corresponding port into 12 first Ethernet packets received from the 12 ports, so as to obtain 12 first Ethernet packets inserted with the control information; and multiplexes, by using a preset multiplexing manner, the 12 first Ethernet packets inserted with the control information, so as to obtain a multiplexed first Ethernet packet; and transmits the multiplexed first Ethernet packet to the switching chip 105 by using the system bus.

The predefined rule includes: inserting/extracting control information in an interframe gap of an Ethernet packet; or, inserting/extracting control information in a preamble of an Ethernet packet; or, inserting/extracting control information in an interframe gap and a preamble of an Ethernet packet.

The preset multiplexing manner includes: a time division multiplexing manner and a bit/byte interleaving manner, which is not limited in the present invention.

The PHY component 300 further includes a control register, which is configured to save the control information of the port of the PHY component 300. The PHY component 300 may set one control register to save the control information of all the ports; and may also set one control register for each port to save respective control information, which is not limited in the present invention. In this embodiment of the present invention, that the PHY component 300 sets one control register to save the control information of all the ports is used as an example for description.

Specifically, as shown in FIG. 3, the PHY component 300 includes a port 0, a port 1, . . . , a port 11, 12 ports in total. The PHY component 300 concurrently receives 12 first Ethernet packets from the 12 ports, for example, receives a first Ethernet packet 0 from the port 0, receives a first Ethernet packet 1 from the port 1, and receives a first Ethernet packet 11 from the port 11. Afterwards, the PHY component 300 separately inserts first control information of a corresponding port into the 12 first Ethernet packets according to the predefined rule. Specifically, an insertion processor 0 inserts, according to the predefined rule, first control information of the port 0, for example, a self-defined MDIO management packet, into the first Ethernet packet received from the port 0, for example, a GMII Ethernet packet. In the same way, an insertion processor 1 inserts, according to the predefined rule, first control information of the port 1, into the first Ethernet packet received from the port 1. In the same way, the insertion processor 2 inserts, according to the predefined rule, first control information of the port 2 into the first Ethernet packet received from the port 2 . . . . By that analogy, an insertion processor 11 inserts, according to the predefined rule, first control information of the port 11 into the first Ethernet packet received by the port 11; so as to obtain 12 first Ethernet packets inserted with the control information. The MDIO management packet may be inserted into a preamble of the GMII Ethernet packet, or be inserted into an interframe gap of the GMII Ethernet packet, or be inserted into both the preamble and the interframe gap of the GMII Ethernet packet. Afterwards, the PHY component 300 multiplexes, by using the preset multiplexing manner, the 12 first Ethernet packets inserted with the control information, so as to obtain a multiplexed first Ethernet packet. Specifically, a time division multiplexer performs time division multiplexing on the 12 first Ethernet packets that are inserted with the control information and are concurrently transmitted, sends the 12 first Ethernet packets to an interleaver for bit/byte interleaving processing, so as to obtain a multiplexed first Ethernet packet. In the end, an encoder, for example, an encoder of an 8 b/10 b encoding format, and a SerDes processes the multiplexed first Ethernet packet, and then the multiplexed first Ethernet packet is sent to the switching chip 105 by using the system bus.

The system bus is specifically configured to transmit the multiplexed first Ethernet packet.

The switching chip 105 receives the multiplexed first Ethernet packet, demultiplexes the multiplexed first Ethernet packet, so as to obtain the 12 first Ethernet packets inserted with the control information; and extracts, according to the predefined rule, the first control information of the corresponding port from the 12 first Ethernet packets inserted with the control information, so as to obtain the 12 first Ethernet packets. Then, the switching chip 105 saves the first control information of the 12 ports to a control memory 1051 of the switching chip 105, so that a processor 104 of the main control board reads and performs corresponding processing.

The foregoing PHY component 300 includes 12 ports, and therefore, that the PHY component 300 concurrently receives 12 first Ethernet packets from a maximum of the 12 ports is used as an example for description. Certainly, the PHY component 300 may receive only 5 first Ethernet packets from 5 ports. The PHY component 300 inserts first control information of a corresponding port into the 5 first Ethernet packets according to the predefined rule, so as to obtain 5 first Ethernet packets inserted with the control information, and then multiplexes, according to the preset multiplexing manner, the 5 first Ethernet packets inserted with the control information, so as to obtain a multiplexed first Ethernet packet; and transmits the multiplexed first Ethernet packet to the switching chip 105 by using the system bus.

Further, the switching chip 105 is further configured to separately insert, according to the predefined rule, second control information of a corresponding port into 12 second Ethernet packets to be sent to the PHY component 300, so as to obtain 12 second Ethernet packets inserted with the control information. Specifically, the switching chip 105 reads the second control information of the 12 ports from the control register 1051, and separately inserts the second control information of the corresponding port into the 12 second Ethernet packets according to the predefined rule; and then multiplexes, by using the preset multiplexing manner, the 12 second Ethernet packets inserted with the control information, so as to obtain a multiplexed second Ethernet packet, and transmits the multiplexed second Ethernet packet to the PHY component 300 by using the system bus.

The system bus is further specifically configured to transmit the multiplexed second Ethernet packet.

The PHY component 300 receives the multiplexed second Ethernet packet, demultiplexes the multiplexed second Ethernet packet, so as to obtain the 12 second Ethernet packets inserted with the control information; and extracts, according to the predefined rule, the second control information of the corresponding port from each second Ethernet packet inserted with the control information, so as to obtain the 12 second Ethernet packets. The PHY component 300 may save the extracted second control information of the port to the control register of the PHY component 300, so that the service board performs management control on the port of the PHY component 300 according to the control information in the control register.

The foregoing PHY component 300 includes 12 ports, and therefore, that the switching chip 105 concurrently sends one second Ethernet packet to each port of the PHY component 300 and a maximum of 12 second Ethernet packets are sent in total is used as an example for description. Certainly, the switching chip 105 may have only 5 second Ethernet packets to be sent to the PHY component 300, and sends the 5 second Ethernet packets to the 5 ports of the PHY component 300 separately. The switching chip 105 inserts second control information of a corresponding port into the 5 second Ethernet packets according to the predefined rule, so as to obtain 5 second Ethernet packets inserted with the control information, and then multiplexes, according to the preset multiplexing manner, the 5 second Ethernet packets inserted with the control information, so as to obtain a multiplexed second Ethernet packet; and transmits the multiplexed second Ethernet packet to the PHY component 300 by using the system bus.

In the embodiment of the present invention, the network device does not require an independent control bus. The service board of the network device does not require a processor, may flexibly allocate a data flow according to configuration of the physical layer component on the service board, and does not increase software complexity of the device. For example, a bandwidth that may be provided by the main control board is 4 Gigabit. Therefore, a physical layer component with four Gigabit interfaces may be used to implement data transmission, or a physical layer component with forty 100M interfaces may be used to implement data transmission.

Optionally, the network device may further include a standby main control board, where the standby main control board includes a standby switching chip. The standby switching chip is connected to the physical layer component by using a standby system bus. The standby system bus consists of a SerDes link. The standby main control board is configured to implement active-standby protection together with the main control board 101, that is, the standby main control board may perform a related operation when the main control board 101 is faulty. In this embodiment of the present invention, the service board is connected to the standby main control board by using the system bus, and a working process and an implementation principle are the same as those between the service board and the main control board 101 in the foregoing embodiment. For details, refer to the foregoing embodiment.

According to the information transmission method provided in this embodiment, a switching chip and a physical layer component are connected by using a system bus consists of a SerDes link, and service data and control information are transmitted by using the system bus. A CPU of a main control board controls the whole network device.

No independent control bus is required between a service board and the main control board, and therefore, the service board does not require a processor, thereby reducing costs of the device. In addition, all network devices are controlled by a processor of the main control board, complexity of the device can be reduced, and an interface type and quantity can be flexibly expanded, thereby resolving a problem of high costs and complexity of a switch in the prior art.

Figure 4:
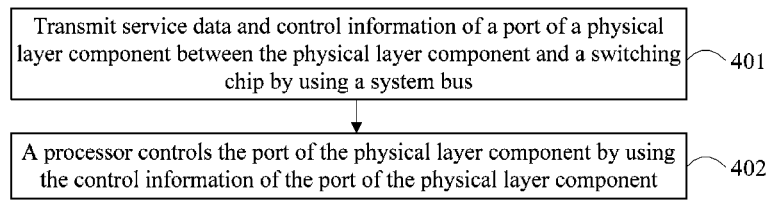
FIG. 4 is a flowchart of an information transmission method according to an embodiment of the present invention.

Further, as shown in FIG. 4, an embodiment of the present invention provides an information transmission method, which is used in the network device 100 shown in FIG. 1 of the present invention.

The method includes:

401: Transmit service data and control information of a port of the physical layer component between the physical layer component and the switching chip by using the system bus.

402: The processor controls the port of the physical layer component by using the control information of the port of the physical layer component.

Optionally, the transmitting, between the physical layer component and the switching chip, service data and control information of a port of the physical layer component by using the system bus includes:

receiving, by the physical layer component, a first Ethernet packet from the port of the physical layer component, where the first Ethernet packet contains the service data; and inserting first control information of the port into the first Ethernet packet according to a predefined rule, so as to obtain a first Ethernet packet inserted with the control information; transmitting, by the physical layer component by using the system bus, the first Ethernet packet inserted with the control information to the switching chip; receiving, by the switching chip, the first Ethernet packet inserted with the control information, and extracting, according to the predefined rule, the first control information of the port from the first Ethernet packet inserted with the control information, so as to obtain the first Ethernet packet. For details, refer to the description in FIG. 2 of the present invention.

The transmitting, between the physical layer component and the switching chip, service data and control information of a port of the physical layer component by using the system bus further includes:

inserting, by the switching chip according to the predefined rule, second control information of a corresponding port into a second Ethernet packet to be sent to the port of the physical layer component, so as to obtain a second Ethernet packet inserted with the control information; transmitting, by the switching chip by using the system bus, the second Ethernet packet inserted with the control information to the physical layer component; and extracting, by the physical layer component, according to the predefined rule, the second control information of the port from the second Ethernet packet inserted with the control information, so as to obtain the second Ethernet packet.

Optionally, the transmitting, between the physical layer component and the switching chip, service data and control information of a port of a physical layer component by using the system bus includes:

separately inserting, by the physical layer component according to a predefined rule, first control information of a corresponding port into multiple first Ethernet packets received from multiple ports of the physical layer component, so as to obtain multiple first Ethernet packets inserted with the control information;

multiplexing, by the physical layer component by using a preset multiplexing manner, the multiple first Ethernet packets inserted with the control information, so as to obtain a multiplexed first Ethernet packet;

transmitting, by the physical layer component, the multiplexed first Ethernet packet to the switching chip by using the system bus; and receiving, by the switching chip, the multiplexed first Ethernet packet, demultiplexing the multiplexed first Ethernet packet, so as to obtain the multiple first Ethernet packets inserted with the control information; and extracting, according to the predefined rule, first control information of a corresponding port from each first Ethernet packet inserted with the control information, so as to obtain the multiple first Ethernet packets.

The preset multiplexing manner includes: a time division multiplexing manner and a bit/byte interleaving manner, which is not limited herein. For details, reference may be made to the description in FIG. 3 of the present invention.

The transmitting, between the physical layer component and the switching chip, service data and control information of a port of the physical layer component by using the system bus further includes:

separately inserting, by the switching chip according to the predefined rule, second control information of a corresponding port into multiple second Ethernet packets to be sent to the physical layer component, so as to obtain multiple second Ethernet packets inserted with the control information; and multiplexing, by using the preset multiplexing manner, the multiple second Ethernet packets inserted with the control information, so as to obtain a multiplexed second Ethernet packet;

transmitting, by the switching chip, the multiplexed second Ethernet packet to the physical layer component by using the system bus; and receiving, by the physical layer component, the multiplexed second Ethernet packet, demultiplexing the multiplexed second Ethernet packet, so as to obtain the multiple second Ethernet packets inserted with the second control information; and extracting, according to the predefined rule, second control information of a corresponding port from each second Ethernet packet inserted with the second control information, so as to obtain the multiple second Ethernet packets.

The predefined rule includes: inserting/extracting control information in an interframe gap of an Ethernet packet; or, inserting/extracting control information in a preamble of an Ethernet packet; or, inserting/extracting control information in an interframe gap and a preamble of an Ethernet packet, which is not limited herein.

According to the information transmission method in a network device provided in this embodiment of the present invention, a switching chip and a physical layer component are connected by using a system bus consists of a SerDes link, and service data and control information are transmitted by using the system bus. A processor of a main control board controls all network devices. No independent control bus is required between a service board and the main control board, and therefore, the service board does not require a processor, thereby reducing costs of the device. In addition, all network devices are controlled by the processor of the main control board, complexity of the device can be reduced, and an interface type and quantity can be flexibly expanded, thereby solving a problem of high costs and complexity of a switch in the prior art.

In the present invention, an interframe gap of an Ethernet packet may be understood as a part of the Ethernet packet, which does not affect the principle and protection scope of the present invention.

Persons of ordinary skill in the art may understand that all or a part of the steps of the method embodiments may be implemented by a program instructing related hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A network device, comprising:
   a main control board, wherein the main control board comprises a processor and a switching chip; and
   a service board, wherein the service board comprises a physical layer component, and the physical layer component comprises a plurality of ports;
   wherein:
   the switching chip is connected to the physical layer component using a system bus;
   the system bus includes a serializer/deserializer (SerDes) link;
   the physical layer component is configured to separately insert, according to a predefined rule, first control information of a port of the plurality of ports obtained for the port through a first management data input/output (MDIO) interface of the port, into a corresponding first Ethernet packet of a plurality of first Ethernet packets received from the plurality of ports, to obtain a plurality of first inserted Ethernet packets, and multiplex the plurality of first inserted Ethernet packets to obtain a multiplexed first Ethernet packet;
   the system bus is configured to transmit the multiplexed first Ethernet packet from the physical layer component to the switching chip;
   the switching chip is configured to demultiplex the multiplexed first Ethernet packet to obtain the plurality of first inserted Ethernet packets, extract, according to the predefined rule, the first control information from each first inserted Ethernet packet to obtain the first control information of the plurality of ports, and separately input the first control information of the plurality of ports into second MDIO interfaces that are of the main control board and respectively corresponding to the plurality of ports, to save the first control information of the plurality of ports as saved first control information; and
   the processor is configured to control the plurality of ports using the saved first control information.

2. The network device according to claim 1, wherein the physical layer component comprises a time division multiplexer, an interleaver, and each of the plurality of ports corresponds to an insertion processor;

an insertion processor corresponding to the port is configured to insert, according to the predefined rule, first control information of the port obtained through the first MDIO interface of the port into the corresponding first Ethernet packet received from the port, to obtain the first inserted Ethernet packet of the port;

the time division multiplexer is configured to perform time division multiplexing on the plurality of first inserted Ethernet packets concurrently transmitted; and the interleaver is configured to perform bit/byte interleaving processing on the plurality of first inserted Ethernet packets from the time division multiplexer to obtain the multiplexed first Ethernet packet.

3. The network device according to claim 1, wherein the switching chip is further configured to separately insert, according to the predefined rule, second control information of the plurality of ports respectively obtained through the second MDIO interfaces into a plurality of second Ethernet packets to be sent to the physical layer component, to obtain a plurality of second inserted Ethernet packets; and multiplex the plurality of second inserted Ethernet packets to obtain a multiplexed second Ethernet packet;

the system bus is further configured to transmit the multiplexed second Ethernet packet from the switching chip to the physical layer component; and the physical layer component is further configured to demultiplex the multiplexed second Ethernet packet, to obtain the multiple second inserted Ethernet packets; and extract, according to the predefined rule, the second control information from each second inserted Ethernet packet, to obtain the second control information of the plurality of ports; and separately input the second control information of the plurality of ports into first MDIO interfaces of the plurality of ports, to save the second control information of the plurality of ports.

4. The network device according to claim 3, wherein the physical layer component is further configured to save the second control information of the plurality of ports to a first control register of the physical layer component as saved second control information; and the service board is configured to perform management control on the plurality of ports according to the saved second control information in the first control register.

5. The network device according to claim 1, wherein the predefined rule comprises:

a rule for inserting/extracting control information in an interframe gap of an Ethernet packet; or a rule for inserting/extracting control information in a preamble of an Ethernet packet; or a rule for inserting/extracting control information in an interframe gap and a preamble of an Ethernet packet.

6. The network device according to claim 1, further comprising:

a standby main control board configured to implement active-standby protection with the main control board, and operate when the main control board is faulty, wherein the standby main control board comprises a standby processor and a standby switching chip;

wherein:

the standby switching chip is connected to the physical layer component by a standby system bus; and the standby system bus includes a second SerDes link.

7. The network device according to claim 1, wherein the physical layer component is configured to obtain the first control information of the plurality of ports from a first control register of the physical layer component through the first MDIO interfaces of the plurality of ports;

the switching chip is configured to save the first control information of the plurality of ports to a second control register of the switching chip as saved first control information; and the processor is configured to adjust statuses of the plurality of ports by modifying the saved first control information in the second control register.

8. An information transmission method, used in a network device, wherein the network device comprises a main control board and a service board, the main control board comprises a processor and a switching chip, and the service board comprises a physical layer component; wherein the physical layer component comprises a plurality of ports, the switching chip is connected to the physical layer component by a system bus, and the system bus includes a serializer/deserializer (SerDes) link; and the information transmission method comprises:

separately inserting, by the physical layer component according to a predefined rule, first control information of a port of the plurality of ports obtained for the port through a first management data input/output (MDIO) interface of the port into a corresponding first Ethernet packet of first Ethernet packets received from the plurality of ports, to obtain a plurality of first inserted Ethernet packets;

multiplexing, by the physical layer component, the plurality of first inserted Ethernet packets to obtain a multiplexed first Ethernet packet;

transmitting, by the physical layer component, the multiplexed first Ethernet packet to the switching chip using the system bus;

receiving, by the switching chip, the multiplexed first Ethernet packet, demultiplexing the multiplexed first Ethernet packet, to obtain the plurality of first inserted Ethernet packets, and extracting the first control information from each first inserted Ethernet packet, to obtain the first control information of the plurality of ports;

separately inputting, by the switching chip, the first control information of the plurality of ports into second MDIO interfaces that are of the main control board and respectively corresponding to the plurality of ports, to save the first control information of the plurality of ports as saved first control information; and controlling, by the processor, the plurality of ports using the saved first control information.

9. The information transmission method according to claim 8, wherein the method further comprises:

separately inserting, by the switching chip according to the predefined rule, second control information of the plurality of ports respectively obtained through the second MDIO interfaces into a plurality of second Ethernet packets to be sent to the physical layer component, to obtain a plurality of second inserted Ethernet packets; and multiplexing the plurality of second inserted Ethernet packets to obtain a multiplexed second Ethernet packet;

transmitting, by the switching chip, the multiplexed second Ethernet packet to the physical layer component using the system bus;

receiving, by the physical layer component, the multiplexed second Ethernet packet, demultiplexing the multiplexed second Ethernet packet, to obtain the plurality of second inserted Ethernet packets; and extracting, according to the predefined rule, the second control information from each second inserted Ethernet packet to obtain the second control information of the plurality of ports; and separately inputting, by the physical layer component, the second control information of the plurality of ports into first MDIO interfaces of the plurality of ports, to save the second control information of the plurality of ports.

10. The information transmission method according to claim 8, wherein the predefined rule comprises:
   a rule for inserting/extracting control information in an interframe gap of an Ethernet packet; or
   a rule for inserting/extracting control information in a preamble of an Ethernet packet; or
   a rule for inserting/extracting control information in an interframe gap and a preamble of an Ethernet packet.

11. The information transmission method according to claim 8, wherein the network device further comprises a standby main control board, the standby main control board comprises a standby processor and a standby switching chip; wherein the standby switching chip is connected to the physical layer component by a standby system bus, and the standby system bus includes a second SerDes link, the method further comprises:
   performing, by the standby main control board, active-standby protection with the main control board, and operating when the main control board is faulty.

12. A network device, comprising:
   a main control board, wherein the main control board comprises a processor and a switching chip; and
   a service board, wherein the service board comprises a physical layer (PHY) component, and the PHY component comprises a port;
   wherein:
   the switching chip is connected to the PHY component using a system bus;
   the PHY component is configured to insert first control information of the port obtained through a first management data input/output (MDIO) interface of the port into a first Ethernet packet received from the port, to obtain a first inserted Ethernet packet;
   the system bus is configured to transmit the first inserted Ethernet packet from the PHY component to the switching chip;
   the switching chip is configured to extract the first control information from the first inserted Ethernet packet, and input the first control information into a second MDIO interface of the main control board to save the first control information as saved first control information; and
   the processor is configured to control the port using the saved first control information.

13. The network device according to claim 12, wherein
   the PHY component is configured to obtain an MDIO management packet from a first control register of the PHY component through the first MDIO interface, wherein the MDIO management packet is the first control information of the port;
   the switching chip is configured to save the first control information of the port to a second control register of the switching chip as saved first control information; and
   the processor is configured to adjust a status of the port by modifying the saved first control information in the second control register.

14. The network device according to claim 12, wherein
   the switching chip is further configured to insert second control information of the port obtained through the second MDIO interface into a second Ethernet packet to be sent to the PHY component, to obtain a second inserted Ethernet packet;
   the system bus is further configured to transmit the second inserted Ethernet packet from the switching chip to the PHY component; and
   the PHY component is further configured to extract the second control information from the second inserted Ethernet packet, and input the second control information into the first MDIO interface to save the second control information.

15. The network device according to claim 14, wherein
   the PHY component is configured to save the second control information to a first control register of the PHY component as saved second control information; and
   the service board is configured to performing management control on the port according to the saved second control information in the first control register.

* * * * *

UNITED STATES PATENT AND TRADEMARK OFFICE
CERTIFICATE OF CORRECTION

PATENT NO. : 10,031,880 B2  
APPLICATION NO. : 14/565982  
DATED : July 24, 2018  
INVENTOR(S) : Li et al.

Page 1 of 1

It is certified that error appears in the above-identified patent and that said Letters Patent is hereby corrected as shown below:

Page 2, Item (56), References Cited, Foreign Patent Documents, "CN773959A" should read -- CN1773959A --.

Signed and Sealed this  
Second Day of October, 2018

Andrei Iancu  
*Director of the United States Patent and Trademark Office*